US008649454B2

United States Patent
Higuchi

(10) Patent No.: US 8,649,454 B2
(45) Date of Patent: Feb. 11, 2014

(54) RECEIVING APPARATUS THAT RECEIVES PACKET SIGNAL IN WHICH A KNOWN SIGNAL IS PLACED IN THE BEGINNING OF PACKET SIGNAL

(71) Applicant: SANYO Electric Co., Ltd., Moriguchi (JP)

(72) Inventor: Keisuke Higuchi, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/772,221

(22) Filed: Feb. 20, 2013

(65) Prior Publication Data
US 2013/0163702 A1 Jun. 27, 2013

Related U.S. Application Data

(63) Continuation of application No. PCT/JP2011/005478, filed on Sep. 28, 2011.

(30) Foreign Application Priority Data

Sep. 28, 2010 (JP) .................................. 2010-217527
Apr. 26, 2011 (JP) .................................. 2011-098669

(51) Int. Cl.
 *H04L 27/28* (2006.01)
(52) U.S. Cl.
 USPC ........... 375/260; 375/130; 375/145; 375/147; 375/150; 375/316; 375/340; 375/343; 375/354; 375/355; 370/509; 370/510; 370/511; 370/512; 370/513
(58) Field of Classification Search
 USPC ......... 375/130, 147, 150, 260, 340, 343, 350, 375/354, 355; 370/509–513
 See application file for complete search history.

(56) References Cited

U.S. PATENT DOCUMENTS

| 7,251,282 | B2 * | 7/2007 | Maltsev et al. ............... 375/260 |
| 7,920,599 | B1 * | 4/2011 | Subramanian et al. ....... 370/509 |
| 2006/0014494 | A1 * | 1/2006 | Vanderperren et al. ...... 455/63.1 |
| 2009/0016376 | A1 | 1/2009 | Sawai | |

(Continued)

FOREIGN PATENT DOCUMENTS

| EP | 2160879 A1 | 3/2010 |
| JP | 2005-202913 A | 7/2005 |

(Continued)

OTHER PUBLICATIONS

International Search Report issued in International Application No. PCT/JP2011/005478 dated Nov. 22, 2011.
International Preliminary Examination Report issued in International Application No. PCT/JP2011/005478 dated Apr. 2, 2013.

*Primary Examiner* — Daniel Washburn
*Assistant Examiner* — Eboni Hughes
(74) *Attorney, Agent, or Firm* — McDermott Will & Emery LLP

(57) ABSTRACT

A detector receives detects a first known signal in a packet signal. An LTF correlation unit performs correlation processing on the packet signal received by a receiving unit. Upon detecting the arrival timing, an update correlation unit terminates a first window and performs correlation processing on the packet signal received by the receiving unit, in a second window. When correction timing is detected and when correction timing is more likely to be accurate than the arrival timing, an estimation unit changes the correction timing to the arrival timing; when the arrival timing is more likely to be accurate than the correction timing, the estimation unit maintains the arrival timing.

13 Claims, 9 Drawing Sheets

40

(56) References Cited

U.S. PATENT DOCUMENTS

| | | |
|---|---|---|
| 2009/0323591 A1 | 12/2009 | Takahashi et al. |
| 2010/0091911 A1* | 4/2010 | Sawai et al. .................. 375/340 |
| 2010/0135447 A1 | 6/2010 | Sapozhnykov et al. |
| 2013/0156137 A1* | 6/2013 | Higuchi ........................ 375/340 |

FOREIGN PATENT DOCUMENTS

| | | |
|---|---|---|
| JP | 2009-021710 A | 1/2009 |
| JP | 2010-011346 A | 1/2010 |
| JP | 2010-531572 A | 9/2010 |
| WO | 2009002242 A1 | 12/2008 |

* cited by examiner

RECEIVING APPARATUS THAT RECEIVES PACKET SIGNAL IN WHICH A KNOWN SIGNAL IS PLACED IN THE BEGINNING OF PACKET SIGNAL

RELATED APPLICATIONS

This application is a Continuation of International Application No. PCT/JP2011/005478, filed on Sep. 28, 2011, which in turn claims the benefit of Japanese Application Nos. 2010-217527, filed on Sep. 28, 2010 and 2011-098669 filed on Apr. 26, 2011, the disclosures of which Applications are incorporated by reference herein.

BACKGROUND OF THE INVENTION

1. Field of the Invention

The present invention relates to a receiving technology, and it particularly relates to a receiving apparatus that receives a packet signal in which a known signal is placed in the beginning of the packet signal.

2. Description of the Related Art

Road-to-vehicle communication has been under investigation in an effort to prevent collision accidents of vehicles on a sudden encounter at an intersection. In a road-to-vehicle communication, information on conditions at an intersection is communicated between a roadside unit and an in-vehicle unit. Such a road-to-vehicle communication requires installation of roadside units, which means a great cost of time and money. In contrast to this, an inter-vehicular communication, in which information is communicated between in-vehicle units, has no need for installation of roadside units. In that case, current position information is detected in real time by GPS (Global Positioning System) or the like and the position information is exchanged between the in-vehicle units. Thus it is determined on which of the roads leading to the intersection the driver's vehicle and the other vehicles are located.

In an intelligent transport system (ITS), the packet signals are received from moving vehicles and therefore the received signals are likely to be subject to the effect of fading. An increased effect of fading deteriorates the accuracy of timing synchronization.

SUMMARY OF THE INVENTION

In order to resolve the above-described problems, a receiving apparatus according to one embodiment of the present invention includes: a receiving unit configured to receive a packet signal having a first known signal followed by a second known signal, wherein the second known signal contains a first symbol and a second symbol placed sequentially; a detector configured to detect the receiving of the first known signal in the packet signal received by the receiving unit; a first processing unit configured to set a first window and detect the arrival timing of the first symbol in the first window, when the detector detects the receiving of the first known signal; a second processing unit configured to terminate the first window, configured to set a second window whose period is shorter than that of the first window, and configured to detect correction timing, relative to the arrival timing, in the second window, when the first processing unit detects the arrival timing; and an estimation unit configured to change the correction timing to the arrival timing if the second processing unit detects the correction timing and if the correction timing is more likely to be accurate than the arrival timing detected by the first processing unit.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
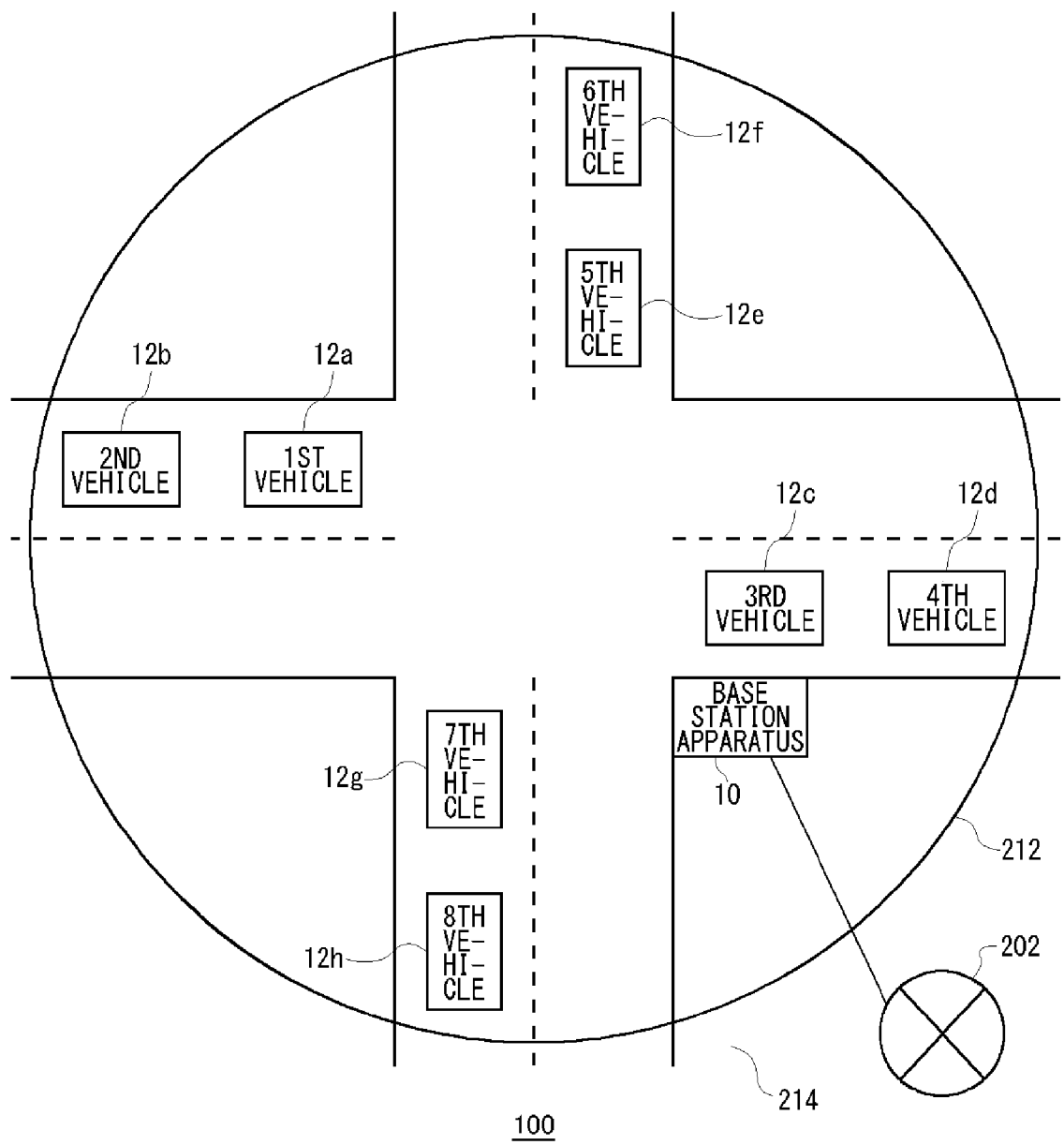
FIG. 1 shows a structure of a communication system according to an exemplary embodiment of the present invention.

The invention will now be described by reference to the preferred embodiments. This does not intend to limit the scope of the present invention, but to exemplify the invention.

Our knowledge underlying the present invention will be explained before exemplary embodiments of the present invention are explained in detail. An access control function called CSMA/CA (Carrier-Sense Multiple Access with Collision Avoidance) is used in wireless LAN (Local Area Network) compliant with IEEE 802.11 and the like. Thus, the same radio channel is shared by a plurality of terminal apparatuses. In such a scheme as CSMA, a packet signal is transmitted after it has been verified by carrier sense that other packet signals are not transmitted. Here, when wireless LAN is applied to the inter-vehicular communication such as ITS, a need arises to transmit information to a large indefinite number of terminal apparatuses, and therefore it is desirable that signals be sent by broadcast.

STF (Short Training Field) placed at a beginning part of a packet signal is used to establish timing synchronization in wireless LAN compliant with IEEE 802.11 and the like. For example, correlation processing is performed based on a STF pattern and a packet signal and then the timing synchronization is established by detecting the peak of correlation values larger than a threshold value. Packet signals sent from a terminal apparatus mounted on a traveling vehicle are received in ITS and therefore the effect of fading tends to increase. As the peak of correlation values gets smaller, the probability that the peak cannot be detected is high. As a result, the timing synchronization is not established even though the packet signals are being received. If the magnitude of the threshold value is set to a smaller value to address this problem, the synchronization may be established with wrong timing and therefore the accuracy of timing synchronization will deteriorate.

Exemplary embodiments of the present invention relate to a communication system that carries out not only an inter-vehicular communication between terminal apparatuses mounted on vehicles but also a road-to-vehicle communication from a base station apparatus installed in an intersection and the like to the terminal apparatuses. As the inter-vehicular communication, a terminal apparatus transmits, by broadcast, a packet signal in which the information such as the traveling speed and position of the vehicle is stored. And the other terminal apparatuses receive the packet signals and recognize the approach or the like of the vehicle based on these items of information. Further, the base station apparatus sends, by broadcast, a packet signal in which information concerning traffic jam and road repairing information are stored. The terminal apparatus recognizes the occurrence of traffic jam and a section and route where the road is under construction.

The format used in the communication system is similar to that used in wireless LAN and is such that STF is placed at a beginning part and LTF (Long Training Field) is placed following STF. LTF contains two OFDM symbols; the first (front) one is called "LTF1" and the second (rear) one is called "LTF2". In wireless LAN, correlation processing is generally performed between a received packet signal and STF. If the peak of correlation values is larger than the threshold value, it will be determined that the timing synchronization has been established. In the communication system according to the present exemplary embodiment, the fading effect is larger than that in wireless LAN and therefore the peak of correlation values tends to drop. In order to suppress the degradation of accuracy in timing synchronization even in such an environment, a receiving apparatus according to the present exemplary embodiment performs the following processing.

As a rising edge of STF in the received packet signal is detected, the receiving apparatus sets a detection period of LTF1 after a predetermined LFT1 detection waiting period has elapsed. The LTF1 detection waiting period is defined such that the LTF1 detection waiting period is shorter than the period of STF, whereas the LTF1 waiting period is defined such that the LTF1 waiting period is shorter than the period of LTF1. The receiving apparatus performs correlation processing between the received packet and LTF1 and then estimates the arrival timing of LTF1 if the peak of correlation values becomes larger than a threshold value. Here, the threshold value is defined to be a small value to a degree such that the arrival timing thereof can be detected even though the peak is low. As the receiving apparatus estimates the arrival timing of LTF1, the receiving apparatus terminates the LTF1 detection period and sets an LTF1 update period that follows the LTF1 detection period. The LFT1 update period is defined such that the LFT1 update period is shorter than the period of LTF1.

In the LTF1 update period, too, the receiving apparatus performs correlation processing on LTF1. If a new peak exceeding the threshold value is detected, the new peak and the already-detected peak will be compared with each other in their magnitudes. If the former is larger than the latter, the timing associated with the new peak will now be changed to the arrival timing. As the LTF1 update period ends, the receiving apparatus repeats the similar process during a new LTF1 update period and changes the arrival timing as necessity arises. This process is repeated until no peaks is detected during the LTF1 update period.

FIG. 1 shows a structure of a communication system 100 according to an exemplary embodiment of the present invention. FIG. 1 corresponds to a case thereof at an intersection viewed from above. The communication system 100 includes a base station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are generically referred to as "vehicle 12" or "vehicles 12", and a network 202. It is to be noted that each vehicle 12 has a not-shown terminal apparatus installed therein. Also, an area 212 is formed around the base station apparatus 10, and an almost-unreachable area 214 is formed outside the area 212.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

In the communication system 100, the base station apparatus 10 is installed at the intersection. The base station apparatus 10 receives the traffic jam information and the road repairing information from the network 202. The base station apparatus 10 generates a packet signal in which the jam information and the road repairing information are stored, and broadcasts the thus generated packet signal containing such items of information. Note that the thus generated packet containing such items of information is broadcast to the terminal apparatuses that are present within the area 212 formed around the base station apparatus 10. As a terminal apparatus mounted on the vehicle 12 receives a packet signal from the base station apparatus 10, the terminal apparatus extracts the jam information and the road repairing information stored in the packet signal. The terminal apparatus conveys the extracted jam information and road repairing information to a driver. The extracted jam information and road repairing information may be conveyed through a display of the information on a monitor, for instance. The terminal apparatus acquires information regarding the present position through GPS or the like and generates a packet signal in which the information on the present position is stored. The terminal apparatus broadcasts the packet signal by CSMA/CA. As the terminal apparatus receives a packet signal from another terminal apparatus, the terminal apparatus notifies the driver that a vehicle 12 where the other terminal apparatus is installed is approaching.

Figure 2:
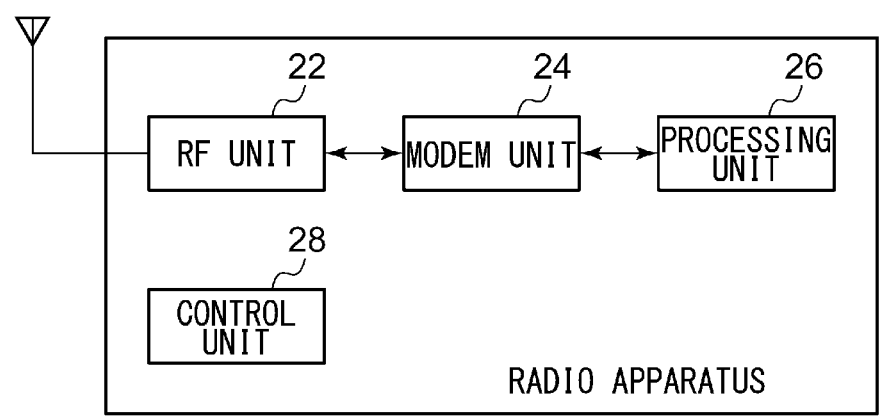
FIG. 2 shows a structure of a radio apparatus mounted on a vehicle shown in FIG. 1.

FIG. 2 shows a structure of a radio apparatus 20 mounted on the vehicle 12. The radio apparatus 20 includes an RF unit 22, a modem unit 24, a processing unit 26, and a control unit 28. The radio apparatus 20 corresponds to a terminal apparatus mounted on the vehicle 12 of FIG. 1 but it may correspond to the base station apparatus 10 of FIG. 1. Hereinafter, the terminal apparatuses and the base station apparatus 10 will be generically referred to as "radio apparatus 20" or "radio apparatuses 20" (first case), and there may also be cases where the terminal apparatus or the base station apparatus 10 is called "radio apparatus 20" (second case). However, no distinction will be made between the first case and the second case.

As a receiving processing, the RF unit 22 receives, through the antenna, packet signals transmitted from other radio apparatuses 20 (not shown). The RF unit 22 performs a frequency conversion on the received packet signal of a radiofrequency and thereby generates a packet signal of baseband. Further, the RF unit 22 outputs the baseband packet signal to the modem unit 24. Generally, a baseband packet signal is formed of an in-phase component and a quadrature component, and therefore it should be represented by two signal lines. However, it is represented by a single signal line here to make the illustration clearer for understanding. The RF unit 22 also includes an LNA (Low Noise Amplifier), a mixer, an AGC (Automatic Gain Control) unit, and an A/D converter.

As a transmission processing, the RF unit 22 performs a frequency conversion on the baseband packet signal inputted from the modem unit 24 and thereby generates a radiofrequency packet signal. Further, the RF unit 22 transmits, through the antenna, the radiofrequency packet signal in a road-to-vehicle transmission period. The RF unit 22 also includes a PA (Power Amplifier), a mixer, and a D-A converter.

As a receiving processing, the modem unit 24 demodulates the radiofrequency packet signal fed from the RF unit 22. Further, the modem unit 24 outputs the demodulation result to the processing unit 26. As a transmission processing, the modem unit 24 modulates the data fed from the processing unit 26. Further, the modem unit 24 outputs the modulation result to the RF unit 22 as a baseband packet signal. It is to be noted here that the communication system 100 is compatible with the OFDM (Orthogonal Frequency Division Multiplexing) modulation scheme and therefore the modem unit 24 performs FFT (Fast Fourier Transform) as a receiving processing and performs IFFT (Inverse Fast Fourier Transform) as a transmission processing also.

Figure 3:
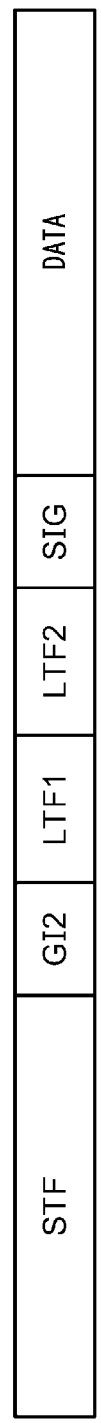
FIG. 3 shows a format of packet signal defined in the communication system of FIG. 1.

A description is now given of the format of packet signal that is to be modulated and demodulated by the modem unit 24. FIG. 3 shows a format of packet signal defined in the communication system 100. As shown in FIG. 3, STF is assigned to the beginning of packet signal. And the STF is followed by GI2, LTF1, LTF2, SIG, and Data. STF is a signal of 160 samples where a signal of 16 samples is repeated ten times. That is, in STF, a signal pattern whose period is shorter than that of LTF1 described later is repeated ten times. LTF1 and LTF2 are periodic of 64 samples in common with each other and are of the identical signal pattern. GI2 is a guard interval for LTF1 or LTF2 and is of 32 samples. GI2, LTF1, and LTF2 constitute LTF. Note here that LTF may be constructed of LTF1 and LTF2. SIG is a control signal and is of 80 samples. This 80-sample SIG contains a guard interval of 16 samples. Refer back to FIG. 2.

As a receiving processing, the processing unit 26 receives the demodulation result by the modem unit 24. The processing unit 26 performs a processing according to the demodulation result. If, for example, the demodulation result is information concerning the present position of the vehicle 12 in which the other radio apparatus is installed, the processing unit 26 will convey the approach or the like of the not-shown other vehicle 12 to the driver via a monitor or speaker. If the demodulation result is the traffic jam information and the road repairing information, the processing unit 26 will convey them to the driver via the monitor or speaker. To carry out the transmission processing, the processing unit 26 includes a GPS receiver, a gyroscope, a vehicle speed sensor, and so forth, all of which are not shown. And the present position, traveling direction, traveling speed and so forth of a not-shown vehicle 12, namely the vehicle 12 carrying the radio apparatus 20 are acquired based on data supplied from the aforementioned not-shown components of the processing unit 26. Hereinafter the present position, traveling direction, traveling speed and so forth will be generically referred to as "present position" or "positional information". The present position thereof is indicated by the latitude and longitude. Known art may be employed to acquire them and therefore the description thereof is omitted here. The processing unit 26 generates a packet signal in which the present position is stored. The processing unit 26 outputs the packet signal to the modem unit 24.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only or a combination of hardware and software.

Figure 4:
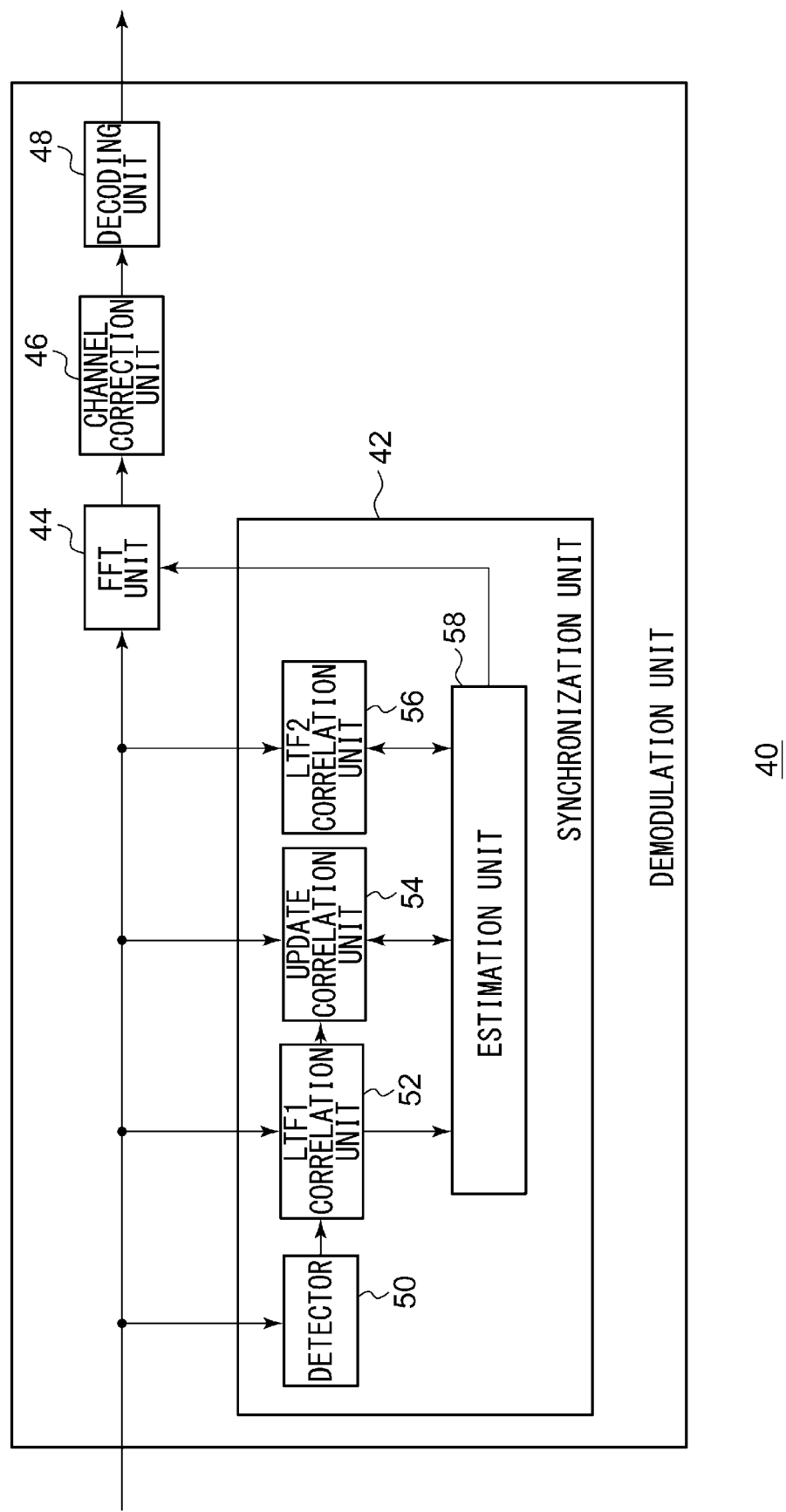
FIG. 4 shows a structure of a demodulation unit included in a modem unit of FIG. 3.

FIG. 4 shows a structure of a demodulation unit 40 included in the modem unit 24. The demodulation unit 40 includes a synchronization unit 42, an FFT unit 44, a channel correction unit 46, and a decoding unit 48. The synchronization unit 42 includes a detector 50, an LTF1 correlation unit 52, an update correlation unit 54, an LTF2 correlation unit 56, and an estimation unit 58.

The detector 50 receives a baseband packet signal from a not-shown radio apparatus 20. The detector 50 detects the receiving of STF in the packet signal. This corresponds to detecting a rising edge of the packet signal. More to the point, the detector 50 computes cross-correlation between the pattern of 16 samples in STF and the packet signal. The structure of a correlator for computing the cross-correlation therebetween is known in the art and therefore the repeated explanation thereof is omitted here. If a correlation value has reached a value greater than a threshold value, the detector 50 will determine that the rising edge thereof has been detected, and then convey the decision result to the LTF1 correlation unit 52. To compute the rising edge thereof, the detector 50 may monitor the signal strength such as RSSI (Received Signal Strength Indication) instead of computing the cross-correlation.

Figure 5:
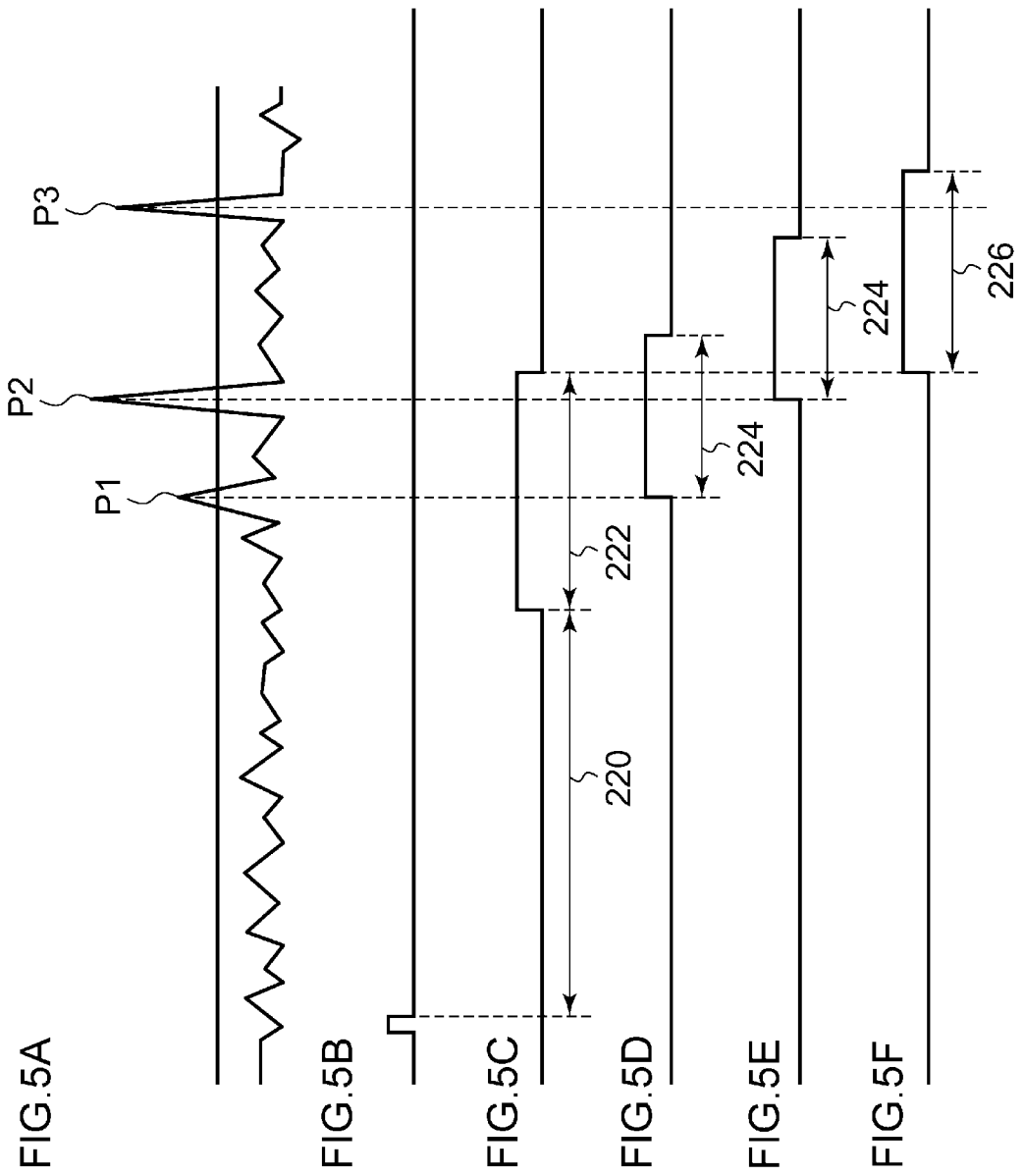
FIGS. 5A to 5F show an operational overview of the demodulation unit of FIG. 4.

FIGS. 5A to 5F show an operational overview of the demodulation unit 40. The horizontal axis represents time. FIG. 5A shows correlation values. The correlation values shown in FIG. 5A correspond to not only correlation values computed by the detector 50 but also those computed by the LTF1 correlation unit 52, the update correlation unit 54, and the LTF2 correlation unit 56 described later. FIG. 5B indicates a decision result by the detector 50. As shown in FIG. 5B, the correlation value is normally set to a low level, and a high level is indicated only when a rising edge is detected. FIGS. 5C to 5F will be explained later. Now refer back to FIG. 4.

The LTF1 correlation unit 52 receives the decision result of the detection of a rising edge from the detector 50. Upon receiving of the decision result thereof fed from the detector 50, the LTF1 correlation unit 52 sets the LTF1 detection period after the LTF1 detection waiting period has elapsed. The LTF1 detection waiting period is a waiting period from during STF up to LTF1 and is defined such that the LTF1 detection waiting period is shorter than the period of STF. Assume herein that the LFT1 detection waiting period is a predetermined fixed value. The LTF1 detection period is a window by which to detect the arrival timing of LTF1 and is longer than or equal to the period of LTF1. FIG. 5C shows an LTF1 detection waiting period 220 and an LTF1 detection period 222 set by the LTF1 correlation unit 52. Now refer back to FIG. 4.

During the LTF1 detection period, the LTF1 correlation unit 52 computes cross-correlation between LTF1 and the packet signal. If the correlation value becomes greater than a threshold value, the LTF1 correlation unit 52 will estimate that the arrival timing of LTF1 has been detected. In the LTF1 detection period 222 of FIG. 5C, peak P1 of FIG. 5A is detected as the arrival timing of the LTF1. Refer back to FIG. 4. Upon detecting the arrival timing of LTF1, the LTF1 correlation unit 52 completes the LTF1 detection period. The LTF1 correlation unit 52 outputs the estimated arrival timing to the update correlation unit 54 and, at the same time, outputs the arrival timing and the correlation value to the estimation unit 58.

As the arrival timing is informed from the LTF1 correlation unit 52, the update correlation unit 54 sets an LTF1 update period. The LTF1 update period is a window by which to detect correction timing for the arrival timing and is shorter than or equal to the period of LTF1. Assume herein that an LTF1 update period 224 is shorter than the LTF1 detection period 222. Refer back to FIG. 4. During the LTF1 update period 224, the update correlation unit 54 computes cross-correlation between LTF1 and the packet signal. If the correlation value becomes greater than a threshold value, the update correlation unit 54 will estimate that the correction timing of LTF1 has been detected. In the LTF1 update period 224 of FIG. 5D, peak P2 of FIG. 5A is detected as the correction timing of the LTF1. Refer back to FIG. 4. Upon detecting the correction timing of LTF1, the update correlation unit 54 completes the LTF1 update period. The update correlation unit 54 outputs the estimated correction timing and the correlation value to the estimation unit 58.

The estimation unit 58 receives a combination of the arrival timing and the correlation value from the LTF1 correlation unit 52. If the update correlation unit 54 detects the correction timing, the estimation unit 58 will also receive a combination of the correction timing and the correlation timing from the update correlation unit 54. If the correlation value corresponding to the correction timing is larger than the correlation value corresponding to the arrival timing, namely, if the correction timing is more likely to be accurate than the arrival timing, the estimation unit 58 will change the correction timing to the arrival timing, that is, the correction timing will be used as a replacement arrival timing. If, on the other hand, the correlation value corresponding to the arrival timing is larger than or equal to that corresponding to the correction timing, namely, if the arrival timing is more likely to be accurate than the correction timing, the correction timing will be removed and the arrival timing will be kept. This corresponds to continuing the detection by delaying a window, namely, shifting the window in a lagged manner according to its detection status. Since the correction timing is changed to the replacement arrival timing if the correlation value of the correction timing is larger than all of the previous correlation values, the detection accuracy can be improved without increasing the threshold value. Further, the threshold does not need to be increased, so that even if the peak drops in a fading environment, such a peak as has dropped can be detected.

If the correction timing is detected based on the correlation processing result by the update correlation unit 54, the estimation unit 58 will instruct the update correlation unit 54 to perform the correlation processing again in a new LTF1 update period 224. The update correlation unit 54 will set the new LTF1 update period 224 according to the instruction given by the estimation unit 58. FIG. 5E shows a new LTF1 update period set by the update correlation unit 54. Refer back to FIG. 4. Similar to the above description, the update correlation unit 54 computes the cross-correlation. If a new correction timing is detected, the update correlation unit 54 will output the newly estimated correction timing and the correlation value to the estimation unit 58.

If the new correction timing combined with and the correlation value is received from the update correlation unit 54, the estimation unit 58 will perform the above-described processing and then change or keep the arrival timing. The above-described processes will be repeated until no correction timing is detected by the update correlation unit 54. If no correction timing is detected using the correlation processing result by the update correlation unit 54, the estimation unit 58 will identify the arrival timing of LTF1. Since no peaks of FIG. 5A is present during the LTF1 update period 224 of FIG. 5E, no correction timing of LTF1 is detected. Refer back to FIG. 4.

If the arrival timing of LTF1 is identified, the estimation unit 58 will instruct the LTF2 correlation unit 56 to perform the cross-correlation processing near the timing delayed by one symbol from the arrival timing of LTF1. The LTF2 correlation unit 56 performs the cross-correlation processing, between the LTF2 and the packet signal, near the timing delayed by one symbol from the arrival timing of LTF1. If the peak of the correlation values is greater than a threshold value, the timing corresponding to this peak is equivalent to the arrival timing of LTF2. That is, the estimation unit 58 verifies how accurate the arrival timing of a first symbol is, based on the correlation processing result by the LTF2 correlation unit 56. If the arrival timing of the LTF2 is shifted from, namely not aligned with, the timing that lags the arrival timing of LTF1 by the duration equivalent to one symbol, the estimation unit 58 may correct the arrival timing of LTF1.

If the arrival timing of LTF1 is not identified, the estimation unit 58 will instruct the LTF2 correlation unit 56 to set a detection period of LTF2. The LTF2 correlation unit 56 then sets the LTF2 detection period according to the instruction given from the estimation unit 58. The LTF2 detection period is a window that is to be set posterior to the LTF1 detection period set by the LTF1 correlation unit 52, and is also a window by which to detect the arrival timing of LTF2. Here, the LTF2 detection period is longer than or equal to the period of LTF1. During the LTF2 detection period, the LTF2 correlation unit 56 computes cross-correlation between LTF2 and the packet signal.

If the correlation value becomes greater than a threshold value, the LTF2 correlation 56 will estimate that the arrival timing of LTF2 has been detected. In an LTF2 detection period 226 of FIG. 5F, peak P3 of FIG. 5A is detected as the arrival timing of the LTF2. Refer back to FIG. 4. Upon detecting the arrival timing of LTF2, the LTF2 correlation unit 56 outputs the arrival timing to the estimation unit 58. The estimation unit 58 estimates the arrival timing of LTF2 based on the correlation processing result by the LTF2 correlation unit 56. Also, the estimation unit 58 identifies the timing, which leads the arrival timing of LTF2 by one symbol (namely, one symbol before the arrival timing of LTF2), as the arrival timing of LTF1. The estimation unit 58 generates timing for each symbol of LTF, SIG, and Data, based on the identified arrival timing of LTF1, and then outputs the thus generating timings to the FFT unit 44.

The FFT unit 44 receives the baseband packet signal from a not-shown radio apparatus 20. The FFT unit 44 delays the packet signal until the timings are generated by the estimation unit 58. The FFT unit 44 performs FFT on the packet signal based on the timings fed from the estimation unit 58. Through the FFT process, a time-domain signal is converted into a frequency-domain signal. The FFT unit 44 outputs the packet, which has been converted into the frequency domain, (hereinafter this signal will also be called "packet signal") to the channel correction unit 46. The channel correction unit 46 receives the packet signal from the FFT unit 44 and estimates the channel characteristics based on the LTF of the packet signal. Also, the channel correction unit 46 corrects the packet signal based on the estimated channel characteristics. The decoding unit 48 decodes an error-correcting code for the packet signal. Known art may be applied to the channel correction unit 46 and the decoding unit 48.

Figure 6:
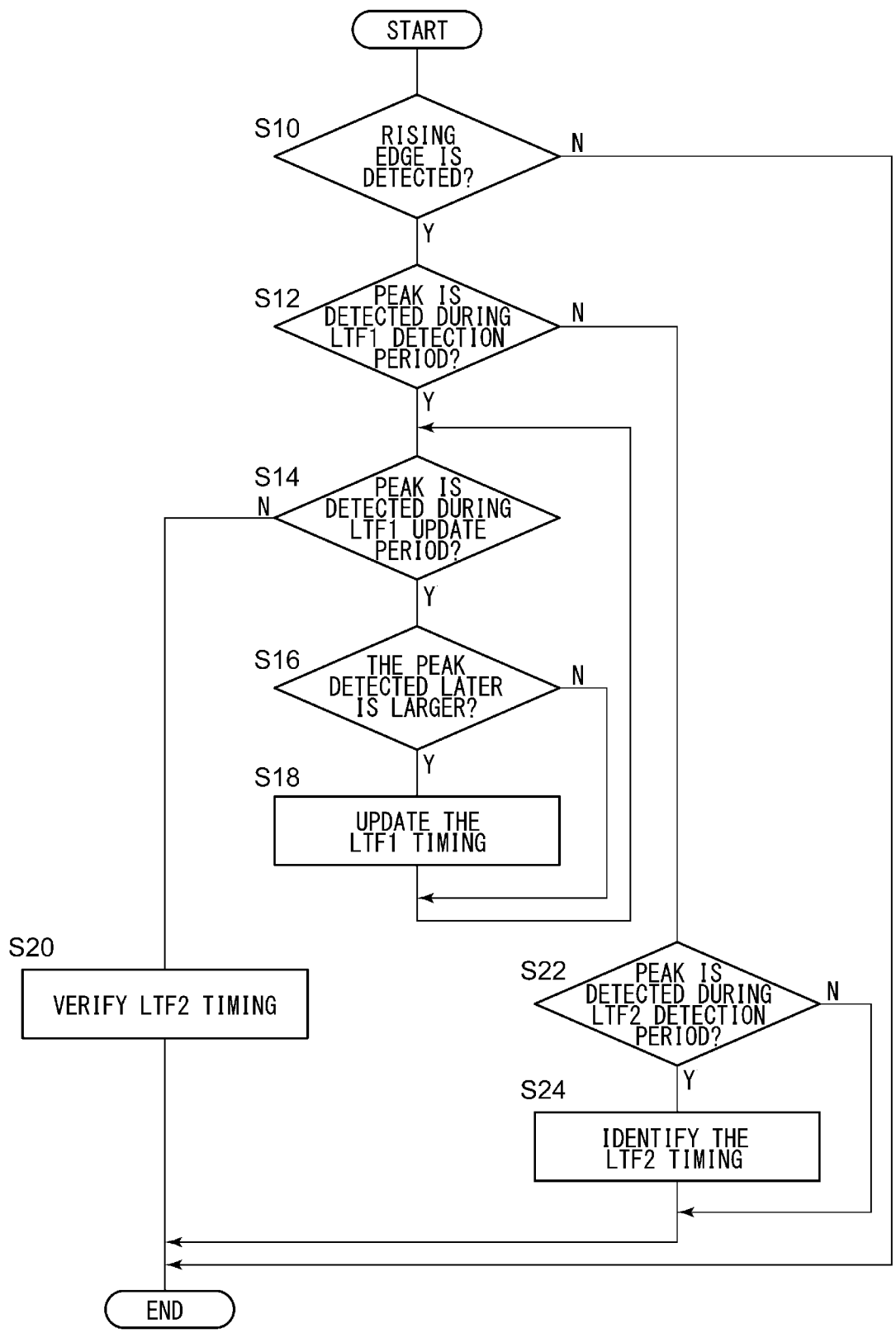
FIG. 6 is a flowchart showing a synchronization procedure performed by the demodulation unit of FIG. 4.

An operation of the communication system 100 configured as above is now described. FIG. 6 is a flowchart showing a synchronization procedure performed by the demodulation unit 40. If (1) the detector 50 detects a rising edge (Y of S10), (2) if the LTF1 correlation unit 52 detects a peak during the LTF1 detection period 222 (Y of S12), (3) if the update correlation unit 54 detects a peak during the LTF1 update period 224 (Y of S14) and (4) if the peak detected later is larger (Y of S16), then the estimation unit 58 will update the arrival timing of LTF1 (S18). If the peak detected later is not larger (N of S16), Step S18 will be skipped. Then the procedure will return to Step S14.

If the update correlation unit 54 does not detect any peak during the LTF1 update period 224 (N of S14), the LTF2 correlation unit 56 will verify the arrival timing of LTF2 (S20). If the LTF1 correlation unit 52 does not detect any peak during the LTF1 detection period 222 (N of S12) and if the LTF2 correlation unit 56 detects a peak during the LTF2 detection period 226 (Y of S22), then the estimation unit 58 will identify the arrival timing of LTF2 (S24). If the LTF2 correlation unit 56 does not detect any peak during the LTF2 detection period 226 (N of S22), Step S24 will be skipped. If the detector 50 does not detect any rising edge (N of S10), the processing will be terminated.

A description is now given of modifications. Similar to the exemplary embodiments, the modifications relate to a receiving apparatus that receives packet signals. Assume in the modifications that the receiving apparatus is provided with a plurality of antennas. The channel characteristics in ITS vary depending on where the receiving apparatus is located at present. For example, the receiving apparatus may be located in a static environment or in an environment where the effect of interference waves is strong. In order to enhance receiving characteristics, it is desirable that the packet signals received respectively by the plurality of antennas be processed according to their channel characteristics. In order to cope with this, the receiving apparatus according to the present modification is configured such that an array processing, in which an adaptive algorithm such as RLS (Recursive Least Square Algorithm) is used, and a method of maximal-ratio combining (MRC) can be executed. Also, both the array processing and MRC are executed in STF, LTF, and SIG of a packet signal. The receiving apparatus selects either the array processing or MRC based on the demodulation result of SIG. The receiving apparatus demodulates Data using the selection result.

Figure 7:
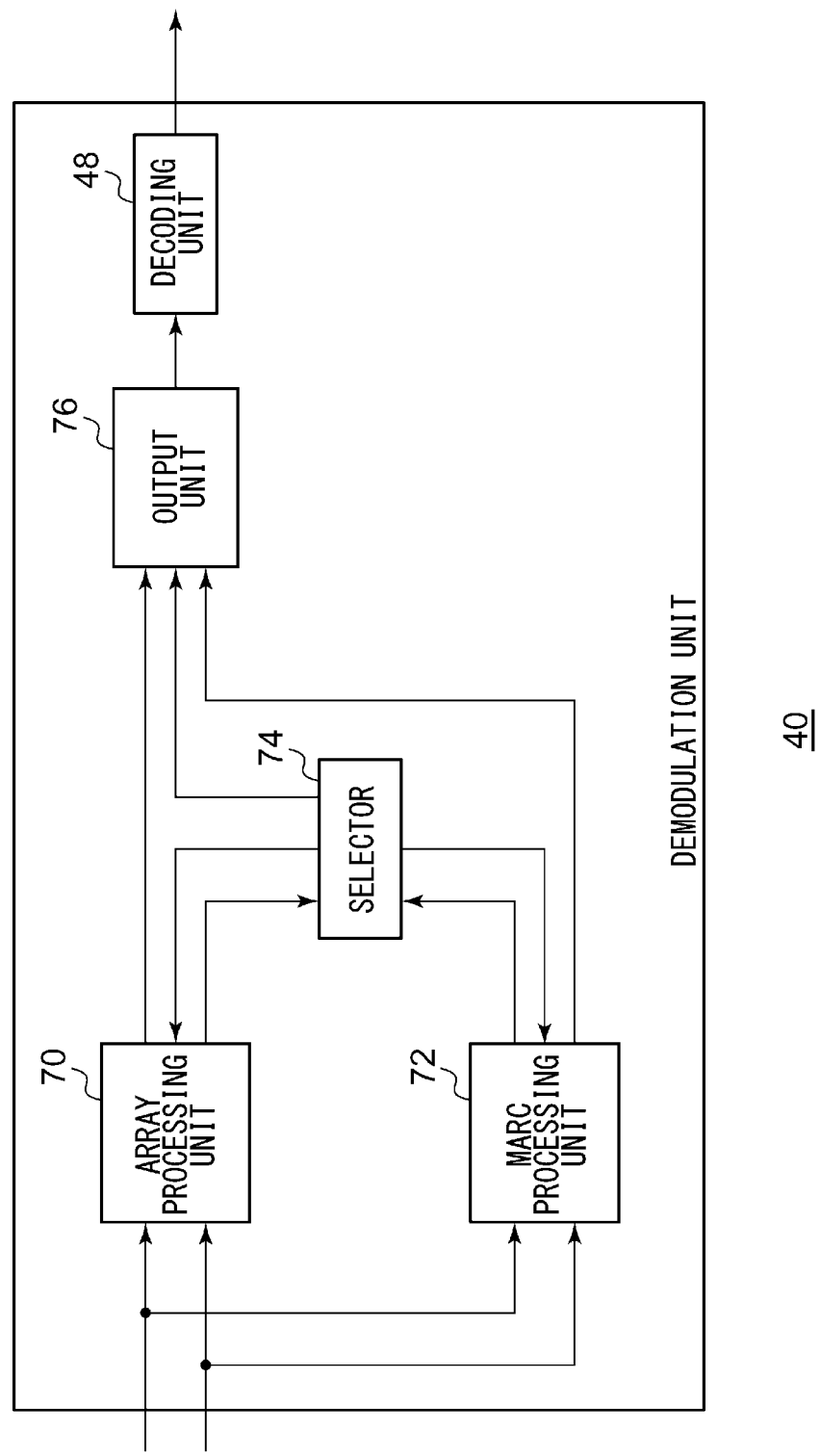
FIG. 7 shows a structure of a demodulation unit according to a modification of an exemplary embodiment.

FIG. 7 shows a structure of a demodulation unit 40 according to a modification of the exemplary embodiments. The demodulation unit 40 includes an array processing unit 70, an MRC (Maximal-Ratio Combining) processing unit 72, a selector 74, an output unit 76, and a decoding unit 48. Assume herein that a not-shown radio apparatus 20 included in the demodulation unit 40 is provided with two antennas. Thus, two packet signals are inputted in parallel with each other to the array processing unit 70. Hereinbelow, the two packet signals inputted in parallel will also be referred to as "packet signal" or "packet signals".

The array processing unit 70 derives weights by performing the RLS algorithm on and across LTS (Long Training Sequence) contained in a packet signal. Also, the array processing unit 70 array-combines (array-synthesizes) SIG and Data by use of the weights. The MRC processing unit 72 derives weights, for use in the maximal-ratio combining, in LTS contained in the packet signal. Also, the array processing unit 70 subjects SIG and Data to the maximal combining by use of the weights.

The selector 74 receives an array combining result of SIG from the array processing unit 70 and receives a maximal-ratio combining result of SIG from the MRC processing unit 72. The selector 74 derives both EVM (Error Vector Magnitude) for the array combining result and EVM for the maximal-ration combining result. The selector 74 compares their EVMs and selects one of EVMs, whichever is smaller. If EVM for the array combining result is selected, the selector 74 will determine the use of the array processing unit 70 for Data; if EVM for the maximal-ratio combining result is selected, the selector 74 will determine the use of the MRC processing unit 72 for Data. The array processing unit 70 or the MRC processing unit 72 not selected by the selector 74 may be stopped in the remaining period of the packet signal. The selector 74 conveys its decision to the output unit 76. The selector 74 also determines the stoppage of one of the array processing unit 70 and the MRC processing unit 72 that has been determined not to be used for Data. If, for example, the array processing unit 70 is determined to be used, the stoppage of the MRC processing unit 72 will be determined; if the MRC processing unit 72 is determined to be used, the stoppage of the array processing unit 70 will be determined.

Figure 8:
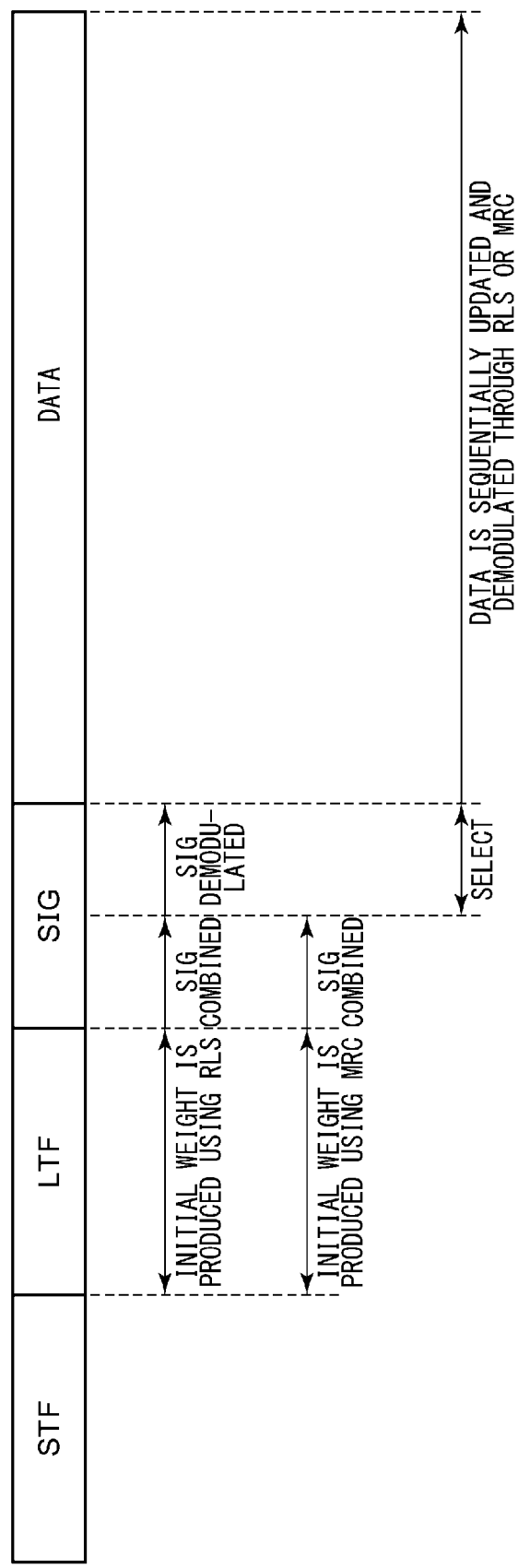
FIG. 8 shows an operational overview of the demodulation unit of FIG. 7.

FIG. 8 shows an operational overview of the demodulation unit 40. Similar to FIG. 3, "STF", "LTF", "SIG" and "Data" are placed in a packet signal shown in FIG. 8. In LTF, an initial weight using the RLS algorithm is produced and an initial weight using MRC is also produced. Synthesis for SIG is done using both the initial weights. Also, the array-synthesized SIG is demodulated. EVMs for the two synthesis results are compared with each other, so that either RLS or MRC is selected. Data is sequentially updated and demodulated through RLC or MRC. Refer back to FIG. 7, the output unit 76 selects a signal from the array processing unit 70 in the period of SIG and selects a signal corresponding to the decision made by the selector 74 in the period of Data.

By employing the exemplary embodiments of the present invention, the arrival timing is estimated before a signal field is corrected with the correction timing, so that the threshold value used to detect the arrival timing can be made smaller. Since the threshold value used to detect the arrival timing is made smaller, the timing synchronization for the packet signal can be detected even though the receiving strength is weak due to the fading effect. Also, the signal field is updated with the correction timing, so that the arrival timing can be corrected should it be detected falsely. Since the false detection is corrected, the synchronization accuracy can be improved. Since the synchronization accuracy is improved, the receiving quality can be improved. Even though the timing synchronization for LTF1 cannot be established, the correlation processing is performed on LTF2. Thus, the timing synchronization can be established finally. Even though the timing synchronization for LTF1 has been established, the timing for LTF2 is verified. Thus the timing synchronization accuracy can be improved.

A method for combining or synthesizing a plurality of packet signals is changed depending on the channel characteristics, so that the receiving quality can be improved. Any of such combining or synthesizing methods is used for Data, the increase in the processing amount can be suppressed. MRC is used in a static environment, so the degradation of the receiving quality can be suppressed even though the period of LTF is short. The array combining is used in an environment where the effect of interference waves is strong, so that the adverse effect of interference waves can be reduced. Since the adverse effect of interference waves is reduced, the degradation of the receiving quality can be suppressed.

The present invention has been described based on the exemplary embodiments. The exemplary embodiments are intended to be illustrative only, and it is understood by those skilled in the art that various modifications to constituting elements and processes as well as arbitrary combinations thereof could be further developed and that such modifications and combinations are also within the scope of the present invention.

In the exemplary embodiments of the present invention, the LTF1 correlation unit 52, the update correlation unit 54, and the LTF2 correlation unit 56 compute cross-correlation and compare a correlation value and a threshold value. However, this should not be considered as limiting and, for example, a value that has undergone a predetermined processing may be compared against the threshold value. For example, a derivation unit for deriving tap coefficients based on the correlation processing result by the detector 50 may further be provided. Also, the correlation processing result is filtered by a filter, where the tap coefficients derived by the LTF1 correlation unit 52, the update correlation unit 54 and the LTF2 correlation unit 56 are set, before the filtered result is compared against the threshold value. According to this modification, the correlation processing result is first filtered and then the filtered result is compared against the threshold value, so that the effect of noise can be reduced.

Figure 9:
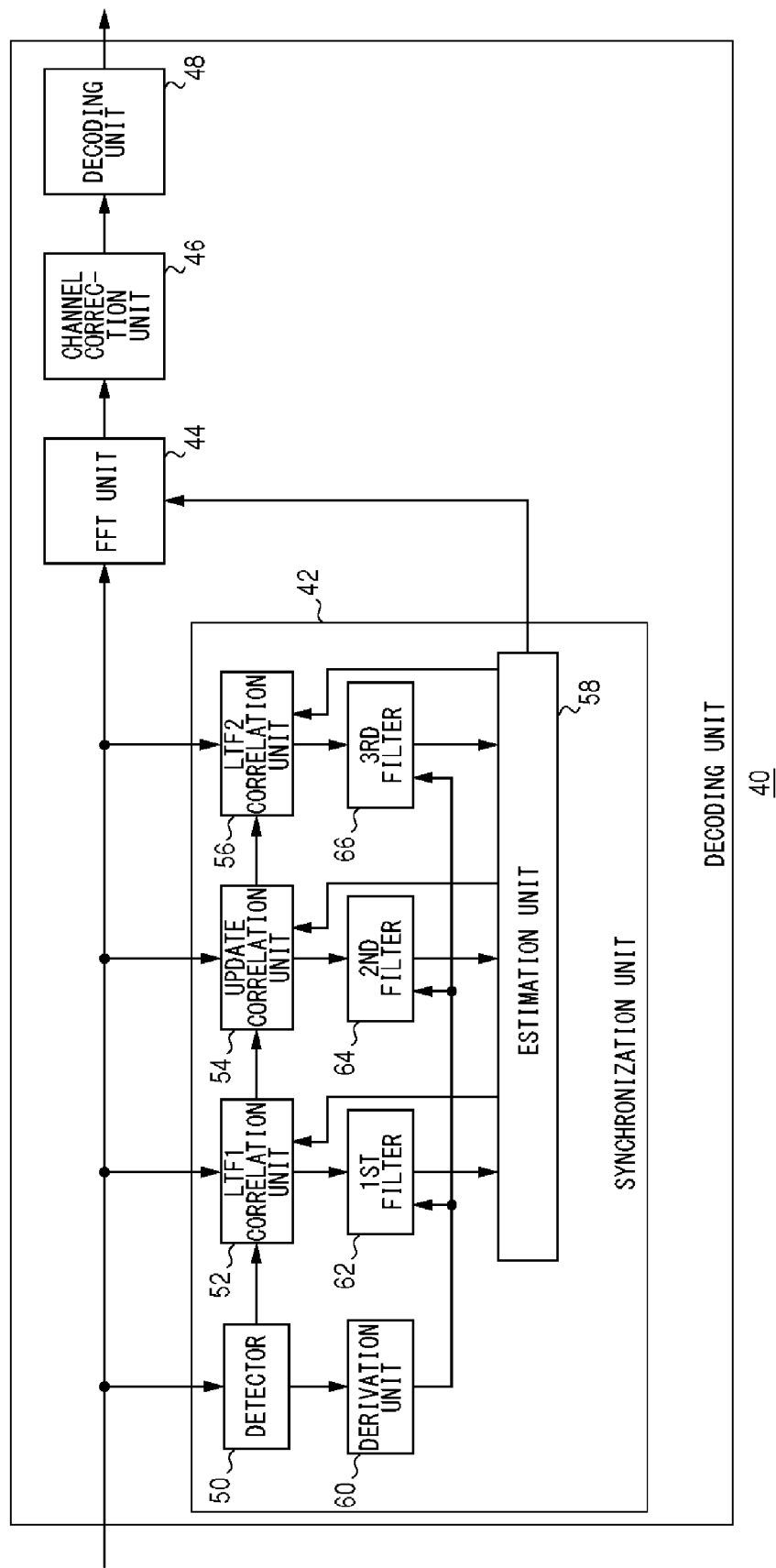
FIG. 9 shows a structure of a demodulation unit according to a modification of an exemplary embodiment.

A description is now given of such a structure of the modification briefly described above with reference to FIG. 9. FIG. 9 shows a structure of a demodulation unit 40 according to the present modification of the exemplary embodiments. In contrast to the demodulation unit 40 of FIG. 4, the demodulation unit 40 according to the present modification includes a derivation unit 60, a first filter 62, a second filter 64, and a third filter 66. The derivation unit 60 receives a correlation value fed from a detector 50. Assume herein that the correlation value is one obtained after a not-shown AGC unit has been locked. Also, time-varying correlation values correspond to a delay profile. The derivation unit 60 derives a plurality of tap coefficients based on a plurality of values included in the delay profile. If, for example, a plurality of values and a plurality of tap coefficients correspond to each other on a one-to-one basis, each value will correspond to each tap coefficient. The derivation unit 60 may perform predetermined operations to derive the tap coefficients. The derivation unit 60 outputs the plurality of tap coefficients to the first filter 62, the second filter 64, and the third filter 66.

The first filter 62 receives the plurality of tap coefficients sent from the derivation unit 60. The first filter 62 is an FIR (Finite Impulse Response) filter comprised of a plurality of taps. The first filter 62 sets each of the received tap coefficients to each tap. The first filter 62 receives a correlation value fed from the LTF1 correlation unit 52 and subject the received correlation value to a filtering process. The first filter 62 outputs the filtering-processed result to the estimation unit 58 as a correlation value. Also, the first filter 62 feeds the correlation value back to the LTF1 correlation unit 52 in order to have the LTF1 correlation unit 52 detect the arrival timing. In so doing, the LTF1 correlation unit 52 detects the arrival timing based on the thus fed-back correlation value. The estimation unit 58 receives the correlation value sent from the first filter 62 and the arrival timing sent form the LTF1 correlation unit 52.

The update correlation unit 54 and the second filter 64 perform the processings similar to those of the LTF1 correlation unit 52 and the first filter 62, respectively, and therefore the repeated description thereof is omitted here. The LTF2 correlation unit 56 and the third filter 66 perform the processings similar to those of the LTF1 correlation unit 52 and the first filter 62, respectively, too, and therefore the repeated description thereof is omitted here. In a fading environment, the peak of the delay profile, namely time-varying peak of correlation values, tends to be gently sloping. The filtering processes by the first filter 62 to the third filter 66 allows such a gently sloping peak to be emphasized and enhanced. That is, the gently sloping peak is converted to a steep peak. Thus the detection probability of the arrival timing and the correction timing can be increased.

In the above case, the derivation unit 60 may perform the following process when a plurality of tap coefficients are derived based on a plurality of values included in the delay profile. That is, the derivation unit 60 selects some of the plurality of values in the descending order up to a predetermined number out of the plurality of values included in the delay profile and then uses the selected values for the tap coefficients. In this case, the tap coefficients are those corresponding to the selected values only. At the same time, the derivation unit 60 sets the tap coefficients for the remaining values in the plurality of values included in the delay profile to "zeros". According to this modification, the effect of noise contained in the tap coefficients can be reduced.

In the above case, the derivation unit 60 may also perform the following process when a plurality of tap coefficients are derived based on a plurality of values included in the delay profile. That is, the derivation unit 60 selects values larger than a threshold value out of the plurality of values included in the delay profile and then uses the selected values for the tap coefficients. In this case, the tap coefficients are those corresponding to the selected values only. At the same time, the derivation unit 60 sets the tap coefficients for the remaining values in the plurality of values included in the delay profile to "zeros". Note that the method of selecting values in the descending order up to a predetermined number and the method of selecting values larger than a threshold value may be combined together. According to this modification, the effect of noise contained in the tap coefficients can be reduced.

In the above case, the derivation unit 60 may also perform the following process when a plurality of tap coefficients are derived based on a plurality of values included in the delay profile. That is, the derivation unit 60 approximates each of a plurality of values included in the delay profile such that each value is equal to or close to the reciprocal of 2 to the n-th. This corresponds to setting tap coefficients that can be processed by bit shifting. According to this modification, the circuit sizes of the first filter 62, the second filter 64 and the third filter 66 can be reduced. Note that the tap coefficients may be complex numbers or electric power values having the scalar components only. If the tap coefficient is a complex number, the tap coefficient may be corrected by a separately estimated frequency offset.

In the exemplary embodiments of the present invention, the detector 50 carries out correlation processing based on the baseband packet signal and each signal pattern. However, this should not be considered as liming and, for example, the detector 50 may perform the correlation processing on the baseband signal in units of two or more signal patterns, namely in units of two signal patterns here. According to this modification, the correlation processing based on the pattern of 16 samples becomes the correlation processing based on the pattern of 32 samples, so that detection accuracy can be improved.

A general description of one embodiment of the present invention is as follows. That is, a receiving apparatus according to one embodiment of the present invention includes: a receiving unit for receiving a packet signal having a first known signal followed by a second known signal, the second known signal contains a first symbol and a second symbol placed sequentially; a detector for detecting the receiving of the first known signal in the packet signal received by the receiving unit; a first processing unit for setting a first window and detecting the arrival timing of the first symbol in the first window, when the detector detects the receiving of the first known signal; a second processing unit for terminating the first window, setting a second window whose period is shorter than that of the first window, and detecting correction timing, relative to the arrival timing, in the second window, when the first processing unit detects the arrival timing; and an estimation unit for changing the correction timing to the arrival timing if the second processing unit detects the correction timing and if the correction timing is more likely to be accurate than the arrival timing detected by the first processing unit.

By employing this embodiment, the arrival timing is estimated before a signal field is corrected with the correction timing. Thus, the threshold value used to detect the arrival timing can be made smaller and the timing synchronization for the packet signal can be detected even though the receiving strength is weak due to the fading effect.

The first window set in the first processing unit may have a longer period than that of the first symbol.

The second window set in the second processing unit may have a shorter period than that of the first symbol.

When the arrival timing is more likely to be accurate than the correction timing, the estimation unit may keep the arrival timing. In this case, the accuracy in detecting the synchronization timing can be improved.

When no correction timing is detected by the second processing unit, the estimation unit may identify the arrival timing of the first symbol. In this case, the synchronization timing can be detected.

When the second processing unit detects the correction timing, the estimation unit may instruct the second processing unit to detect again the correction timing in a new second window. In this case, the accuracy in detecting the synchronization timing can be improved.

In the first known signal in the packet signal received by the receiving unit, a signal pattern whose period is shorter than that of the first symbol may be repeated a plurality of times, and the detector may detect the first known signal in a manner such that the detector performs correlation processing on the packet signal received by the receiving unit in units of two or more signal patterns.

The receiving apparatus may further include a derivation for deriving a tap coefficient of a filter by performing correlation processing on between a signal pattern and the packet signal received by the receiving unit, the signal pattern, whose period is shorter than that of the first symbol, being repeated a plurality of times in the first known signal in the packet signal received by the receiving unit. The first processing unit and the second processing unit may perform filtering by use of the filter in which the tap coefficient derived by the derivation unit is set. In this case, the correlation processing result is first filtered and then the filtered result is compared against the threshold value, so that the effect of noise can be reduced.

The receiving apparatus may further include a third processing unit for setting a third window, whose period is longer than or equal to that of the first symbol, posterior to the first window set by the first processing unit and detecting the arrival timing of the second symbol, when the arrival timing of the first symbol is not identified by the estimation unit. The estimation unit may estimate the arrival timing of the second symbol based on a processing result in the third processing unit. In this case, the accuracy in detecting the synchronization timing can be improved.

The receiving apparatus may further include a third processing unit for detecting the arrival timing of the second symbol in a neighborhood of timing lagged from the arrival timing of the first symbol by one symbol, when the arrival timing of the first symbol is identified by the estimation unit. The estimation unit may verify accuracy of the arrival timing of the first symbol based on a processing result in the third processing unit. In this case, the accuracy in detecting the synchronization timing can be improved.

Another embodiment of the present invention relates also to a receiving apparatus. The receiving apparatus includes: a receiving unit for receiving a packet signal having a first known signal followed by a second known signal, the second known signal contains a first symbol and a second symbol placed sequentially; a detector for detecting the first known signal in the packet signal received by the receiving unit; a derivation unit for deriving a tap coefficient of a filter based on a result of correlation processing performed by the detector between a signal pattern and the packet signal received by the receiving unit, the signal pattern, whose period is shorter than that of the first symbol, being repeated a plurality of times in the first known signal in the packet signal received by the receiving unit; and a processing unit for setting a window, whose period is longer than or equal to that of the first symbol, when the detector detects the receiving of the first known signal, and detecting the arrival timing of the first symbol by use of the filter in which the tap coefficient derived by the derivation unit is set.

By employing this embodiment, the correlation processing result is first filtered and then the filtered result is compared against the threshold value, so that the effect of noise can be reduced.

The derivation unit may use values, which are selected in the descending order up to a predetermined number out of the result of correlation processing, as the tap coefficients, and may set the tap coefficients for the remaining values in the result of correlation processing to zeros. In this case, the adverse effect of noise contained in the tap coefficients can be reduced.

The derivation unit may use values, which are larger than a threshold value in the result of correlation processing, as the tap coefficients and may set the tap coefficients for the remaining values in the result of correlation processing to zeros. In this case, the adverse effect of noise contained in the tap coefficients can be reduced.

What is claimed is:

1. A receiving apparatus comprising:
  a receiving unit configured to receive a packet signal having a first known signal followed by a second known signal, wherein the second known signal contains a first symbol and a second symbol placed sequentially;
  a detector configured to detect the receiving of the first known signal in the packet signal received by the receiving unit;
  a first processing unit configured to set a first window and detect the arrival timing of the first symbol in the first window, when the detector detects the receiving of the first known signal;
  a second processing unit configured to terminate the first window, configured to set a second window whose period is shorter than that of the first window, and configured to detect correction timing, relative to the arrival timing, in the second window, when the first processing unit detects the arrival timing; and an estimation unit configured to change the correction timing to the arrival timing if the second processing unit detects the correction timing and if the correction timing is more likely to be accurate than the arrival timing detected by the first processing unit.

2. A receiving apparatus according to claim 1, wherein the first window set in the first processing unit has a longer period than that of the first symbol.

3. A receiving apparatus according to claim 1, wherein the second window set in the second processing unit has a shorter period than that of the first symbol.

4. A receiving apparatus according to claim 1, wherein, when the arrival timing is more likely to be accurate than the correction timing, the estimation unit maintains the arrival timing.

5. A receiving apparatus according to claim 1, wherein, when no correction timing is detected by the second processing unit, the estimation unit identifies the arrival timing of the first symbol.

6. A receiving apparatus according to claim 1, wherein, when the second processing unit detects the correction timing, the estimation unit instructs the second processing unit to detect again the correction timing in a new second window.

7. A receiving apparatus according to claim 1, wherein, in the first known signal in the packet signal received by the receiving unit, a signal pattern whose period is shorter than that of the first symbol is repeated a plurality of times, and wherein the detector detects the first known signal in a manner such that the detector performs correlation processing on the packet signal received by the receiving unit in units of two or more signal patterns.

8. A receiving apparatus according to claim 1, further comprising a derivation unit configured to derive a tap coefficient of a filter by performing correlation processing between a signal pattern and the packet signal received by the receiving unit, the signal pattern, whose period is shorter than that of the first symbol, being repeated a plurality of times in the first known signal in the packet signal received by the receiving unit, wherein the first processing unit and the second processing unit perform filtering by use of the filter in which the tap coefficient derived by the derivation unit is set.

9. A receiving apparatus according to claim 1, further comprising a third processing unit configured to set a third window, whose period is longer than or equal to that of the first symbol, posterior to the first window set by the first processing unit and configured to detect the arrival timing of the second symbol, when the arrival timing of the first symbol is not identified by the estimation unit, wherein the estimation unit estimates the arrival timing of the second symbol based on a processing result in the third processing unit.

10. A receiving apparatus according to claim 1, further comprising a third processing unit configured to detect the arrival timing of the second symbol in a neighborhood of timing lagged from the arrival timing of the first symbol by one symbol, when the arrival timing of the first symbol is identified by the estimation unit, wherein the estimation unit verifies accuracy of the arrival timing of the first symbol based on a processing result in the third processing unit.

11. A receiving apparatus comprising:

a receiving unit configured to receive a packet signal having a first known signal followed by a second known signal, wherein the second known signal contains a first symbol and a second symbol placed sequentially;

a detector configured to detect the first known signal in the packet signal received by the receiving unit;

a derivation unit configured to derive a tap coefficient of a filter based on a result of correlation processing performed by the detector between a signal pattern and the packet signal received by the receiving unit, the signal pattern, whose period is shorter than that of the first symbol, being repeated a plurality of times in the first known signal in the packet signal received by the receiving unit; and a processing unit configured to set a window, whose period is longer than or equal to that of the first symbol, when the detector detects the receiving of the first known signal, and configured to detect the arrival timing of the first symbol by use of the filter in which the tap coefficient derived by the derivation unit is set.

12. A receiving apparatus according to claim 11, wherein the derivation unit uses values, which are selected in descending order up to a predetermined number out of the result of correlation processing, as the tap coefficients, and sets the tap coefficients for the remaining values in the result of correlation processing to zeros.

13. A receiving apparatus according to claim 11, wherein the derivation unit uses values, which are larger than a threshold value in the result of correlation processing, as the tap coefficients and sets the tap coefficients for the remaining values in the result of correlation processing to zeros.

\* \* \* \* \*